(12) United States Patent
Yang et al.

(10) Patent No.: US 9,885,595 B2
(45) Date of Patent: Feb. 6, 2018

(54) NON-CONTACT CONTINUOUS TYPE SENSING DEVICE FOR A FLOWMETER AND SENSING METHOD THEREOF

(71) Applicant: ENERGY MANAGEMENT SYSTEM CO., LTD., Tainan (TW)

(72) Inventors: Chung-Ming Yang, Tainan (TW); Wen-Tzu Wu, Tainan (TW); Cheng-Hsien Su, Tainan (TW); Chung-Wei Li, Tainan (TW); Mei-Ling Tseng, Tainan (TW); Chih-Hsun Lin, Tainan (TW)

(73) Assignee: Energy Management System Co., Ltd., Tainan (TW)

( * ) Notice: Subject to any disclaimer, the term of this patent is extended or adjusted under 35 U.S.C. 154(b) by 0 days.

(21) Appl. No.: 15/384,819

(22) Filed: Dec. 20, 2016

(65) Prior Publication Data

US 2017/0176227 A1 Jun. 22, 2017

(30) Foreign Application Priority Data

Dec. 22, 2015 (TW) .............................. 104143076 A

(51) Int. Cl.
*G01F 15/06* (2006.01)
*G01F 1/06* (2006.01)

(52) U.S. Cl.
CPC ............ *G01F 15/065* (2013.01); *G01F 1/065* (2013.01)

(58) Field of Classification Search
CPC ...................................................... G01F 15/065
See application file for complete search history.

(56) References Cited

U.S. PATENT DOCUMENTS

2006/0230842 A1* 10/2006 Trygg ........................ G01F 1/24
73/861.46

* cited by examiner

*Primary Examiner* — Jewel V Thompson
(74) *Attorney, Agent, or Firm* — Rosenberg, Klein & Lee

(57) ABSTRACT

The present invention relates to a non-contact continuous type sensing device for a flowmeter and a sensing method thereof. The flowmeter includes a movable member that is connected to an operating member and that is driven by a fluid to move, thereby moving the operating member. A projector is mounted above the operating member and projects signals onto the operating member. At least two regions are defined in a side of the operating member facing the projector. At least one of the at least two regions includes metal material to reflect the signals projected thereon. A signal density in a space between the projector and the operating member is changed when the operating member is passing through the space, such that the projection power of the projector is affected to thereby sense a movement condition of the operating member and to thereby continuously know a flowing condition of the fluid.

7 Claims, 17 Drawing Sheets

NON-CONTACT CONTINUOUS TYPE SENSING DEVICE FOR A FLOWMETER AND SENSING METHOD THEREOF

BACKGROUND OF THE INVENTION

The present invention relates to a non-contact continuous type sensing device for a flowmeter and a sensing method thereof and, more particularly, to a non-contact continuous type sensing device for a flowmeter and a sensing method thereof that are not affected by external magnetic members while sensing the flowing condition of a fluid.

A flowmeter is a tool mounted in a fluid pipe for detecting the fluid flow. Conventional flowmeters generally include a metering device therein. The metering device has a rotating member that can be driven to rotate by a fluid, such that the metering device can calculate the total flow of the fluid flowing therethrough. The metering device of early flowmeters includes a contact-type (mechanical) mechanism including members that are driven to rotate by each other. After long-term use, error or malfunction of the driving effect between the members occurs due to mechanical factors and impurities in the fluid, leading to adverse influence to the sensitivity and accuracy of metering. Non-contact type flowmeters using magnetic induction are developed accordingly. However, the conventional non-contact type flowmeters still have the following disadvantages in practical use. Firstly, magnetic members of the conventional non-contact type flowmeters are apt to be attracted or interfered by strong external magnetism, leading to an inaccurate metering result. Secondly, the conventional flowmeters can only meter the volumetric flow and cannot sense the flowing direction of the fluid. In fact, in the current conditions of severe lack and imbalance of water resources, the possibility and necessity of mutual support or transaction between administration units owing water resources often exist. In this case, a flowmeter mounted in piping to sense the flowing direction of the fluid can provide certain convenience in the support or transaction.

In view of the foregoing disadvantages, Applicant of the present invention filed an invention patent application entitled "NON-CONTACT CONTINUOUS TYPE SENSING DEVICE FOR A FLOWMETER AND SENSING METHOD THEREOF" (Taiwan Invention Patent No. 1418767) which discloses a flowmeter including a movable member connected to an operating member. When the movable member is driven by a fluid, the movable member actuates the operating member to displace. A projector is mounted above the operating member for projecting signals onto the operating member. At least two regions are defined in a side of the operating member facing the projector. At least one of the regions can reflect the signal projected thereon to cause a change in the signal density in the space between the projector and the operating member when the operating member is passing through the space. Thus, the projecting power of the projector is affected to sense the movement condition of the operating member to thereby know the flowing condition of the fluid.

However, projection of signals by the projector onto the operating member is often proceeded intermittently, such that the detected flow condition often presents interrupted detection results in which the abscissa axis is the time. Thus, improvement to the precision of the detection results is desired.

BRIEF SUMMARY OF THE INVENTION

With the motive of ceaseless research and development, Applicant makes improvement based on Taiwan Invention Patent No. 1418767 entitled "NON-CONTACT CONTINUOUS TYPE SENSING DEVICE FOR A FLOWMETER AND SENSING METHOD THEREOF".

The present invention provides a non-contact continuous type sensing device for a flowmeter. The flowmeter includes a body and the sensing device. The body includes two open ends and a hollow interior in which a movable member is mounted. The movable member is configured to be driven by a fluid to move. The movable member includes a shaft mounted in the hollow interior of the body. The flowmeter further includes a chamber located outside of the body. The sensing device is mounted in the chamber. The sensing device includes an operating member and a projector. The shaft of the movable member extends through and is connected to the operating member. The operating member is actuated by the shaft of the movable member to proceed with displacement when the movable member is driven by the fluid to rotate.

The projector is mounted above the operating member and is configured to project signals onto the operating member. At least two regions are defined in a side of the operating member facing the projector. At least one of the at least two regions includes metal material to reflect the signals projected thereon. Another of the at least two regions is a non-metal region. The projector includes an oscillation/sensing element and a micro power driving/sensing circuit. The micro power driving/sensing circuit is electrically connected to a micro power oscillation circuit and a micro power signal filtering circuit. The micro power signal filtering circuit is electrically connected to a micro power signal amplifying circuit. The micro power signal amplifying circuit is electrically connected to a micro power signal strength detection circuit for detecting output signals. A signal density in a space between the projector and the operating member is changed when the at least two regions of the operating member is passing through the space, such that the projection power of the projector is affected to thereby sense a movement condition of the operating member and to thereby continuously know a flowing condition of the fluid.

In an example, the displacement of the operating member actuated by the shaft of the movable member is a circular movement.

In an example, the displacement of the operating member actuated by the shaft of the movable member is a rectilinear reciprocating movement.

In an example, the at least two regions of the operating member includes at least two regions having the metal material, and the non-metal region is located between the at least two regions, providing different reflections.

In an example, the at least two regions of the operating member include at least two regions having the metal material and having a same width or different widths.

In an example, the at least two regions of the operating member include at least two regions coated with the metal material with a same coating density or different coating densities.

Another objective of the present invention is to provide a non-contact continuous type sensing method for a flowmeter. The flowmeter includes a body and a sensing device. The body includes two open ends and a hollow interior in which a movable member is mounted. The movable member is configured to be driven by a fluid to move. The movable member includes a shaft mounted in the hollow interior of the body. The flowmeter further includes a chamber located outside of the body. The sensing device is mounted in the chamber. The sensing device includes an operating member and a projector. The shaft of the movable member extends through and is connected to the operating member. The operating member is actuated by the shaft of the movable member to proceed with displacement. The projector is mounted above the operating member and is configured to project signals onto the operating member. At least two regions are defined in a side of the operating member facing the projector. At least one of the at least two regions reflects the signals projected thereon.

The method is featured by that a signal density in a space between the projector and the operating member is changed when the at least two regions of the operating member are passing through the space, such that the projection power of the projector is affected to thereby sense a movement condition of the operating member and to thereby continuously know a flowing condition of the fluid.

At least one of the at least two regions of the operating member is made of metal material, and another of the at least two regions is a non-metal region, providing different reflections.

The projector includes an oscillation/sensing element and a micro power driving/sensing circuit. The micro power driving/sensing circuit is electrically connected to a micro power oscillation circuit and a micro power signal filtering circuit. The micro power signal filtering circuit is electrically connected to a micro power signal amplifying circuit. The micro power signal amplifying circuit is electrically connected to a micro power signal strength detection circuit for continuously detecting output signals.

The present invention will become clearer in light of the following detailed description of illustrative embodiments of this invention described in connection with the drawings.

DETAILED DESCRIPTION OF THE INVENTION

Figure 1:
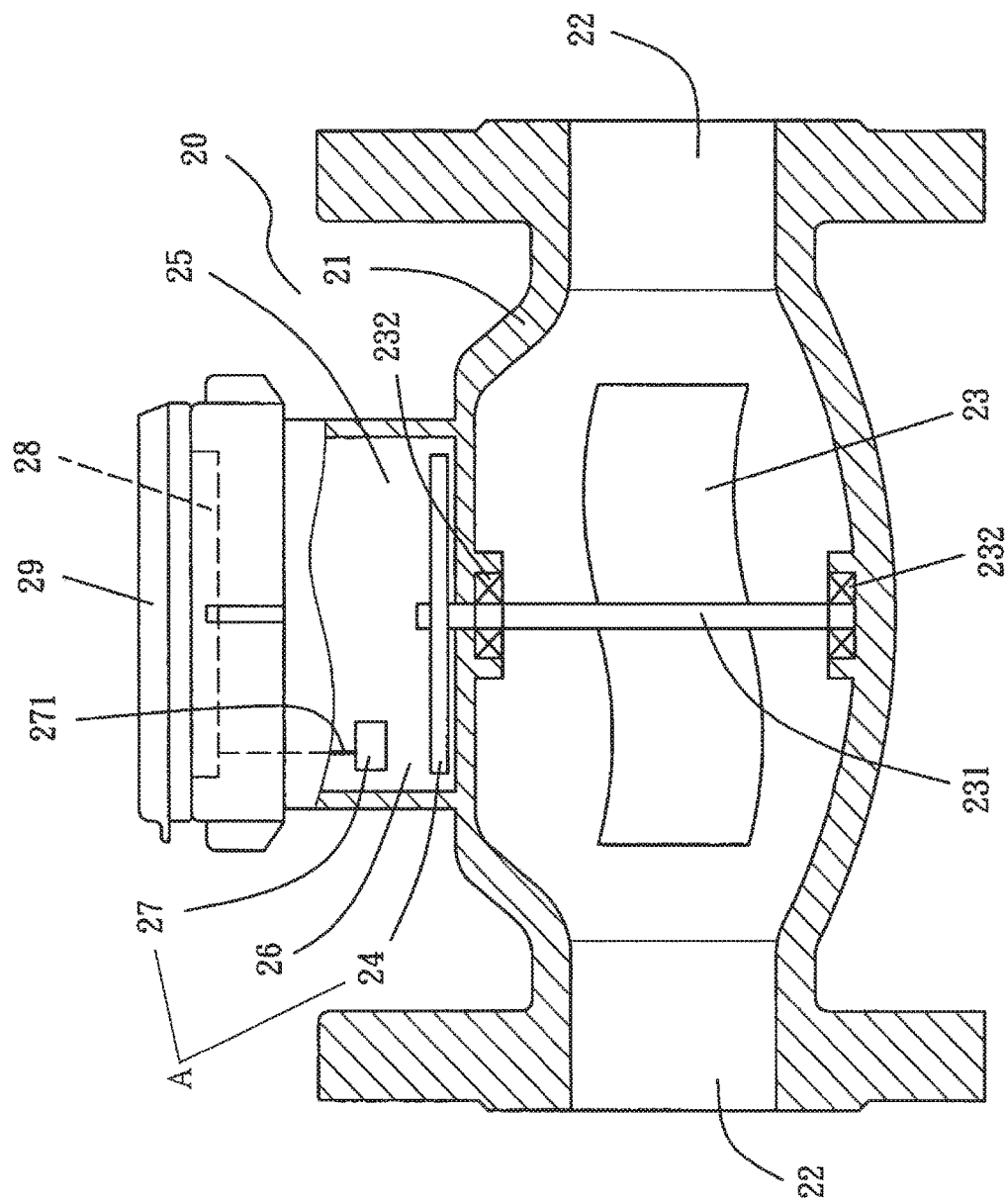
FIG. 1 is a diagrammatic cross sectional view of a flowmeter of a first embodiment according to the present invention.

With reference to FIG. 1, a flowmeter 20 of a first embodiment according to the present invention includes a body 21 having two open ends 22 (selectively used as a water inlet and a water outlet) and a hollow interior in which a movable member 23, such as a blade wheel, is mounted. The movable member 23 is configured to be driven by a fluid to rotate. The movable member 23 includes a shaft 231 that is supported by bearings 232 to extend upright in the body 21. An upper end of the shaft 231 extends upward beyond the body 21 and is connected to a disc-shaped operating member 24.

When the shaft 231 rotates, the operating member 24 is actuated by the shaft 23 to rotate synchronously, which is a circular movement. A chamber 25 is located above the body 21 and receives the operating member 24. A space 26 is defined in a side of the chamber 25 above the operating member 24. A projector 27 is fixed in the space 26 and is connected to an operating portion 28 by a connecting wire 271. A display portion 29 is disposed on a top face of the chamber 25 and can receive the result after operation of the operating operation 28 for direct display. Alternatively, the result of the operation is transmitted by wire or wireless transmission to a remote display portion for display purposes.

Figure 17:
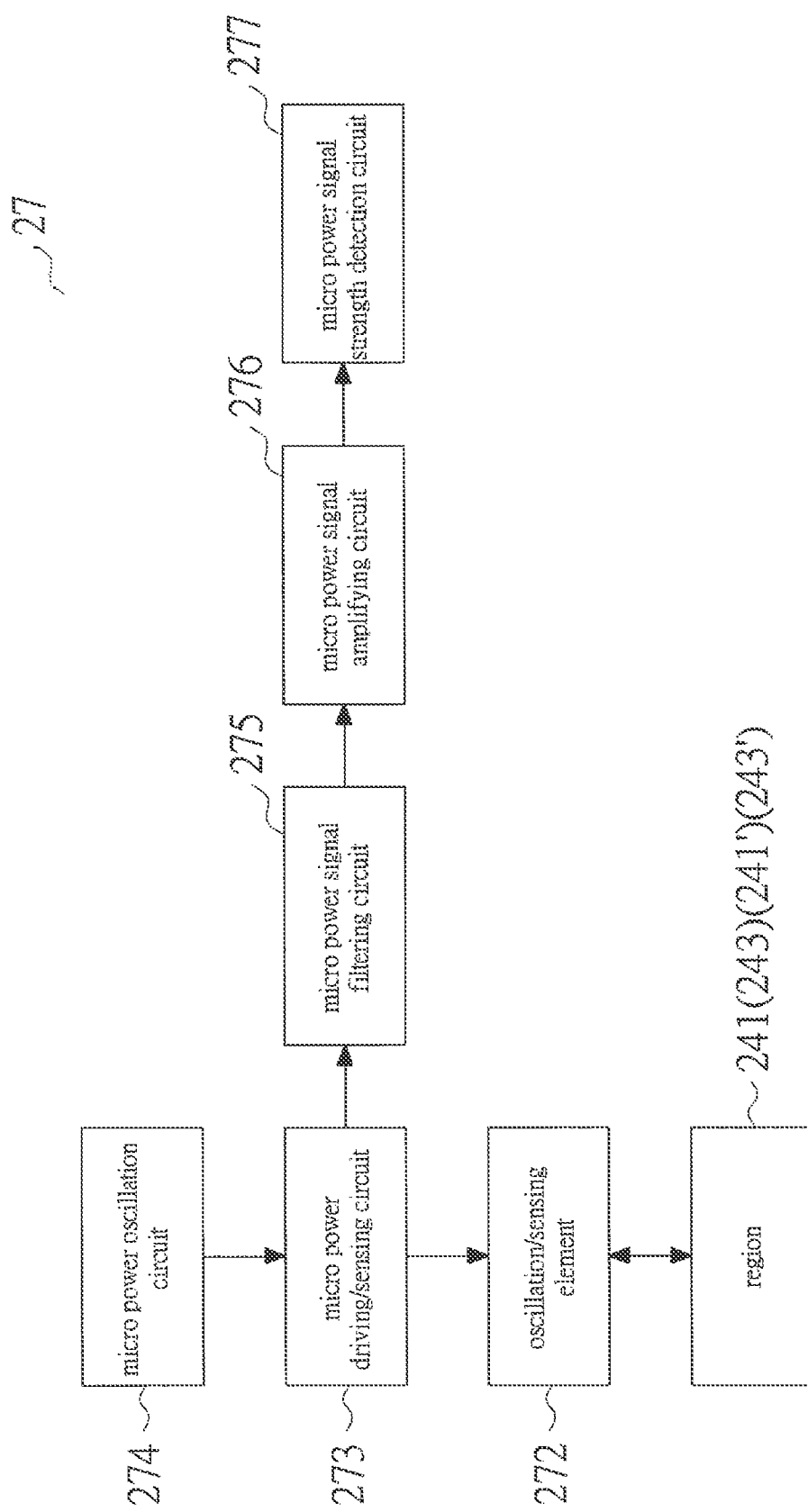
FIG. 17 is a diagrammatic block diagram illustrating a status in which the operating member is aligned with a projector according to the present invention.

With reference to FIG. 17, the projector 27 according to the present invention includes an oscillation/sensing element 272 and a micro power driving/sensing circuit 273. The micro power driving/sensing circuit 273 is electrically connected to a micro power oscillation circuit 274 and a micro power signal filtering circuit 275. The micro power signal filtering circuit 275 is electrically connected to a micro power signal amplifying circuit 276. The micro power signal amplifying circuit 276 is electrically connected to a micro power signal strength detection circuit 277 for detecting an output signal. The oscillation/sensing element 272 proceeds with continuous detection which is advantageous in continuous detection of the position of the operating member 24 at any time under certain conditions of the operating member 24, which will be described hereinafter.

Figure 2:
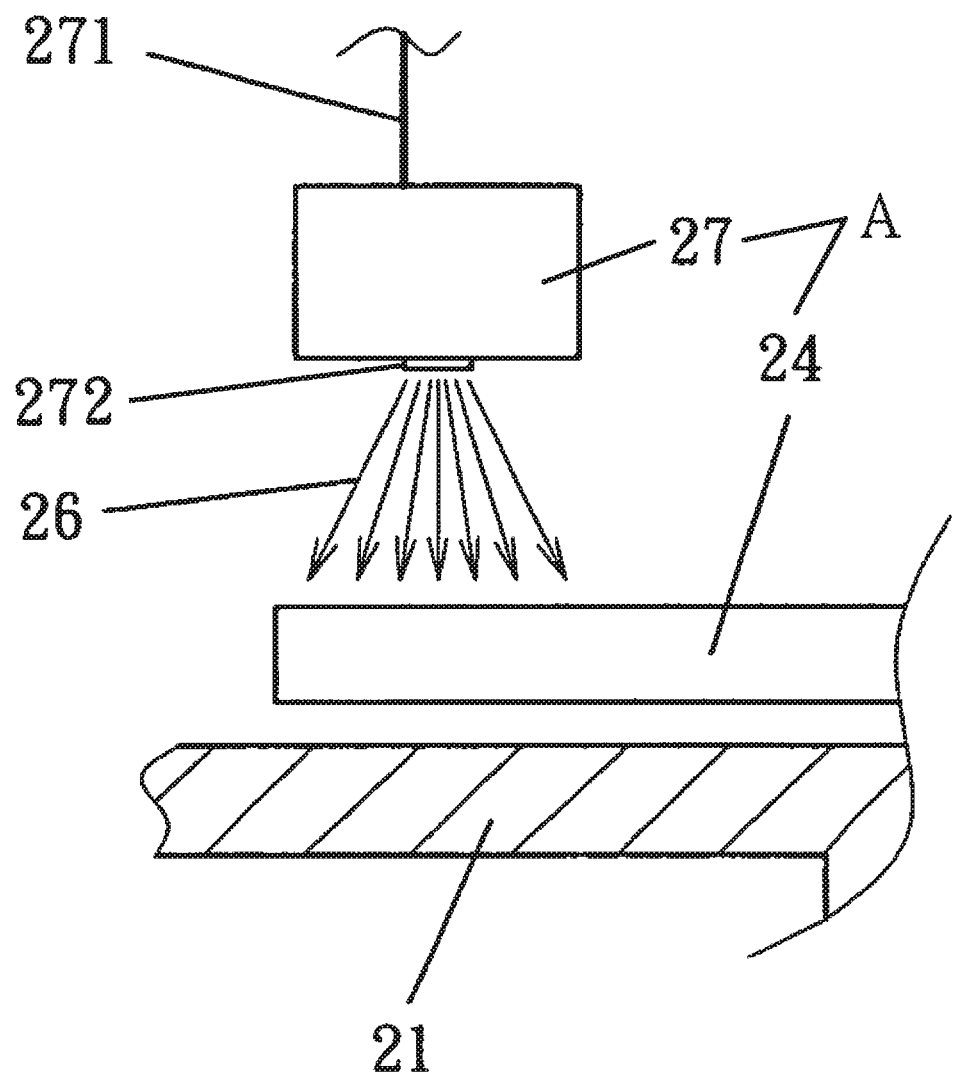
FIG. 2 is an enlarged diagrammatic view of a portion of the flowmeter of the first embodiment according to the present invention.

With reference to FIG. 2, the projector 27 faces the operating member 24, and the oscillation/sensing element 272 continuously transmits signals onto a side of the operating member 24. Thus, the dimension of the space 26 must assure that the signals of the protector 27 can reach the operating member 24, and the operating member 24 can rotate together with the shaft 231.

Figure 3:
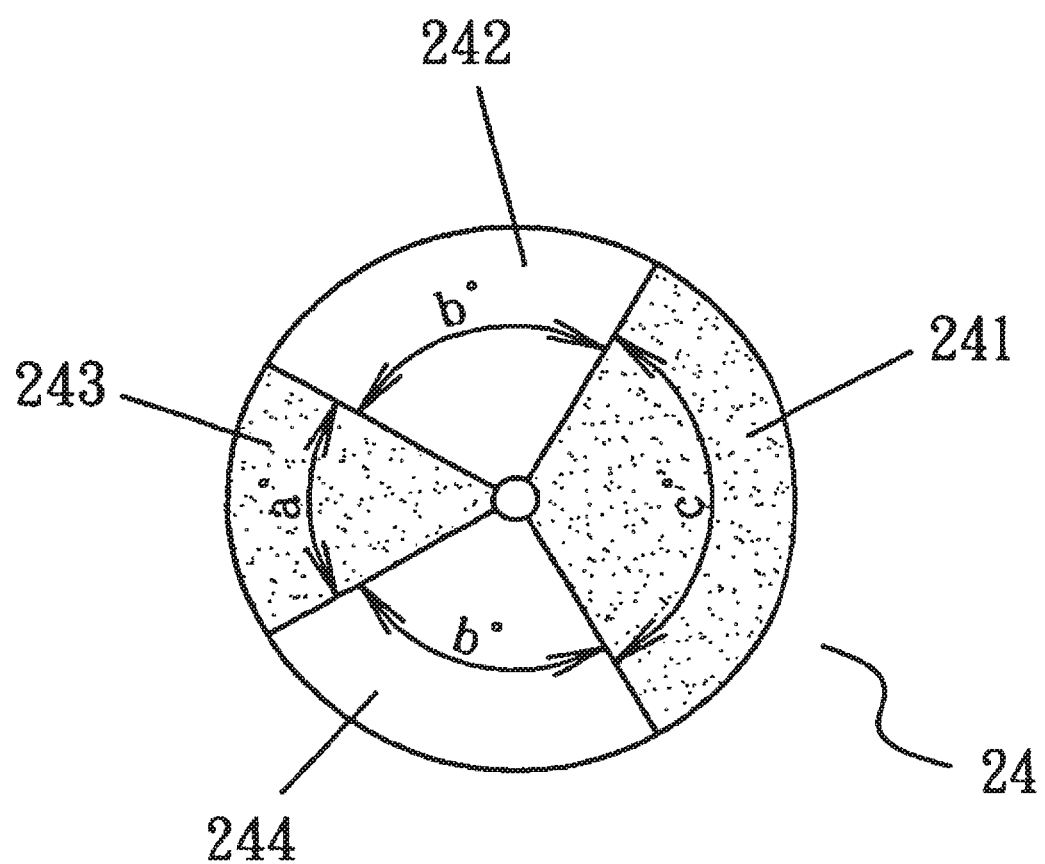
FIG. 3 is a top view of an operating member of the flowmeter of the first embodiment according to the present invention.
Figure 4:
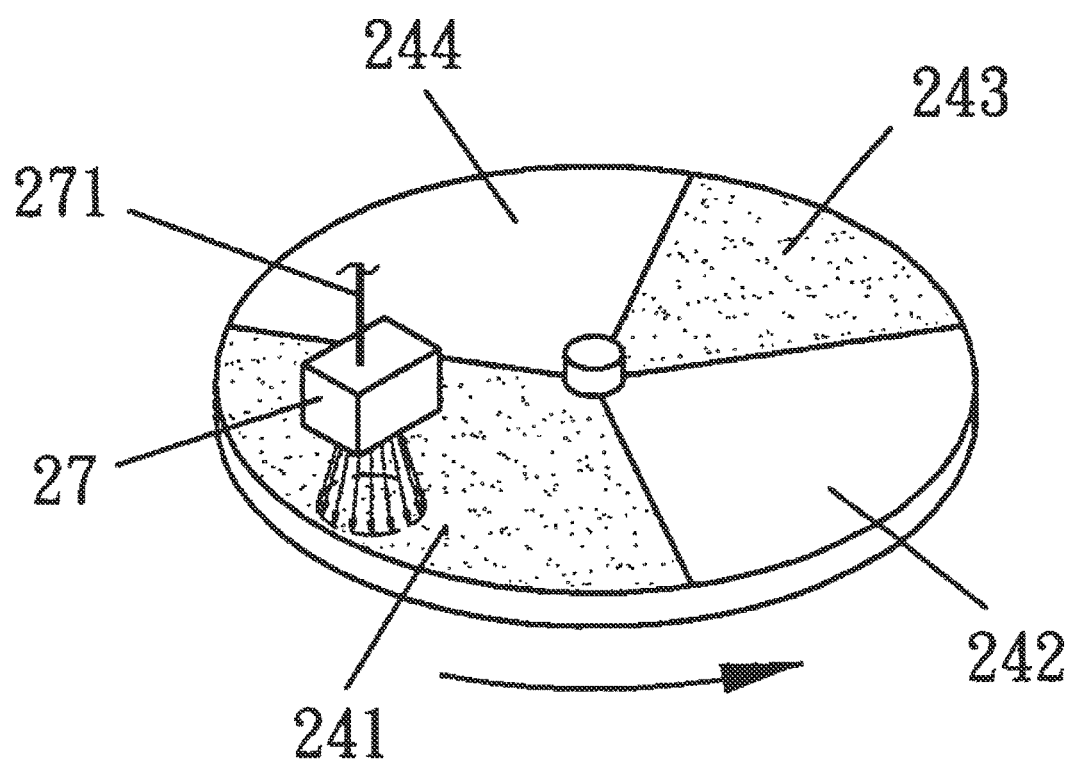
FIGS. 4-7 are diagrammatic perspective views illustrating operation of the flowmeter of the first embodiment according to the present invention.

With reference to FIGS. 3 and 17, the side of the operating member 24 facing the projector 27 (and receiving the signals from the projector 27) is divided into a plurality of regions 241, 242, 243, 244 spaced angularly from each other (four regions in a non-restrictive example shown in FIG. 3) having a center at the shaft 231. Two regions 242 and 244 not contiguous to each other extend through the same angle b° (namely, the widths are the same). Another two regions 241 and 243 not contiguous to each other extend through different angles a° and c° (namely, the widths are different). The two regions 241 and 243 and having different widths include metal material (illustrated by the dots in the figures) for reflecting the signals from the projector 27. Comparatively, the two regions 242 and 244 having the same width do not reflect the signals from the projector 27.

When the regions with the metal material of the operating member 24 is within the detection range of the oscillation/sensing element 272 of the projector 27, since the transmission energy of the oscillation/sensing element 272 is absorbed by the operating member 24, the received signal strength is lower than a set threshold, and an output signal indicative of detection of an object is generated.

When the regions with the metal material of the operating member 24 is not within the detection range of the oscillation/sensing element 272 of the projector 27, since the transmission energy of the oscillation/sensing element 272 is not absorbed by the operating member 24, the received signal strength is higher than the set threshold, and an output signal (indicating that no object is detected) is generated.

In operation and use of the first embodiment according to the present invention, when the fluid flows in through different open ends 22, the rotating direction of the movable member 23 and its shaft 231 is different. For example, if the fluid flows in through the left open end 22 (see FIG. 1), the movable member 23 and its shaft 231 rotate in the counterclockwise direction. On the other hand, if the fluid flows in through the right open end 22, the movable member 23 and its shaft 231 rotate in the clockwise direction. Thus, when the movable member 23 and its shaft 231 rotate in the counterclockwise direction, the operating member 24 is actuated to also rotate in the counterclockwise direction, such that the signals continuously transmitted from the projector 27 will project onto the regions 241, 244, 243, and 242 in sequence (the sequence shown by FIGS. 4, 5, 6, and 7) on and on. Likewise, when the movable member 23 and its shaft 231 rotate in the clockwise direction, the operating member 24 is actuated to also rotate in the clockwise direction, such that the signals continuously transmitted from the projector 27 will project onto the regions 241, 242, 243, and 244 in sequence (the sequence shown by FIGS. 4, 7, 6, and 5) on and on.

The operation between the projector 27 and the operating member 24 will be described by the example of counterclockwise direction of the operating member 24. Firstly, when the operating member 24 is within the detection range of the oscillation/sensing element 272 of the projector 27 and the transmission energy transmitted by the oscillation/sensing element 272 of the projector 27 is projected onto the region 241 (see FIG. 4), since the region 241 includes the metal material, the transmission energy of the oscillation/sensing element 272 of the projector 27 is absorbed, and the projector 27 senses that the signal strength is lower than the set threshold (because the energy is absorbed by the object detected). Thus, the projector 27 will sense that the signal transmission is not smooth, and the projection power must be increased accordingly. Furthermore, the time length of the non-smooth transmission (corresponding to the width of the region) is calculated.

Figure 5:
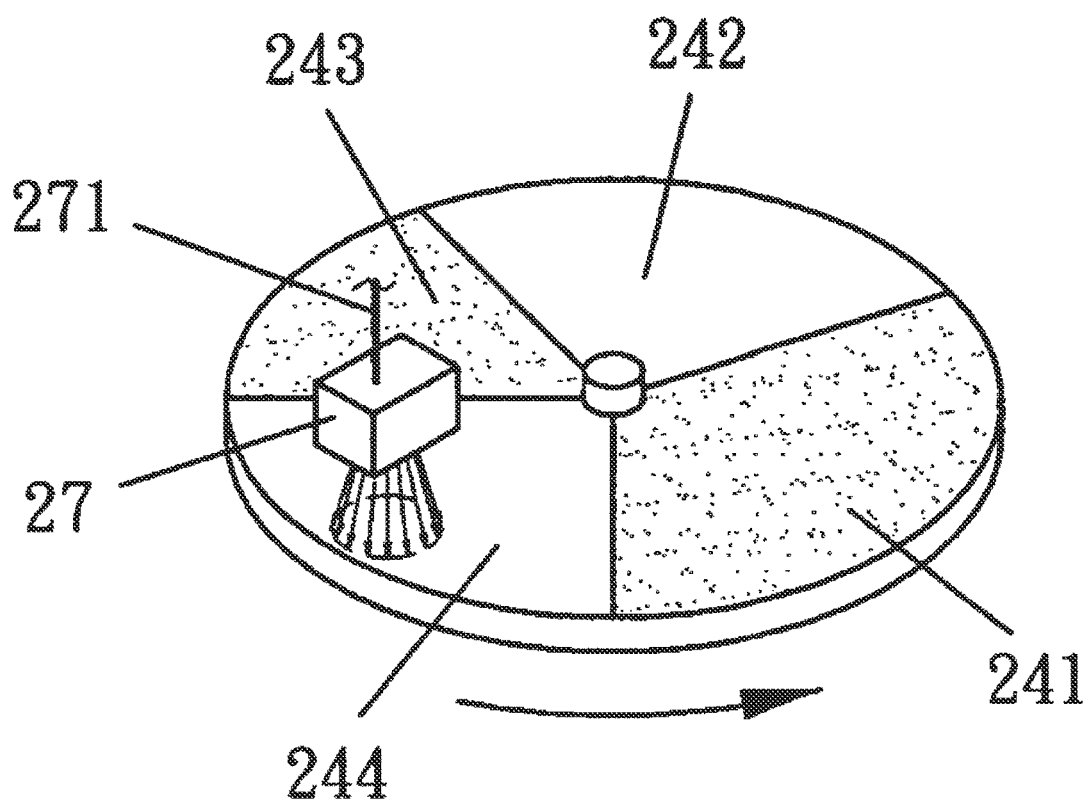
Figure 6:
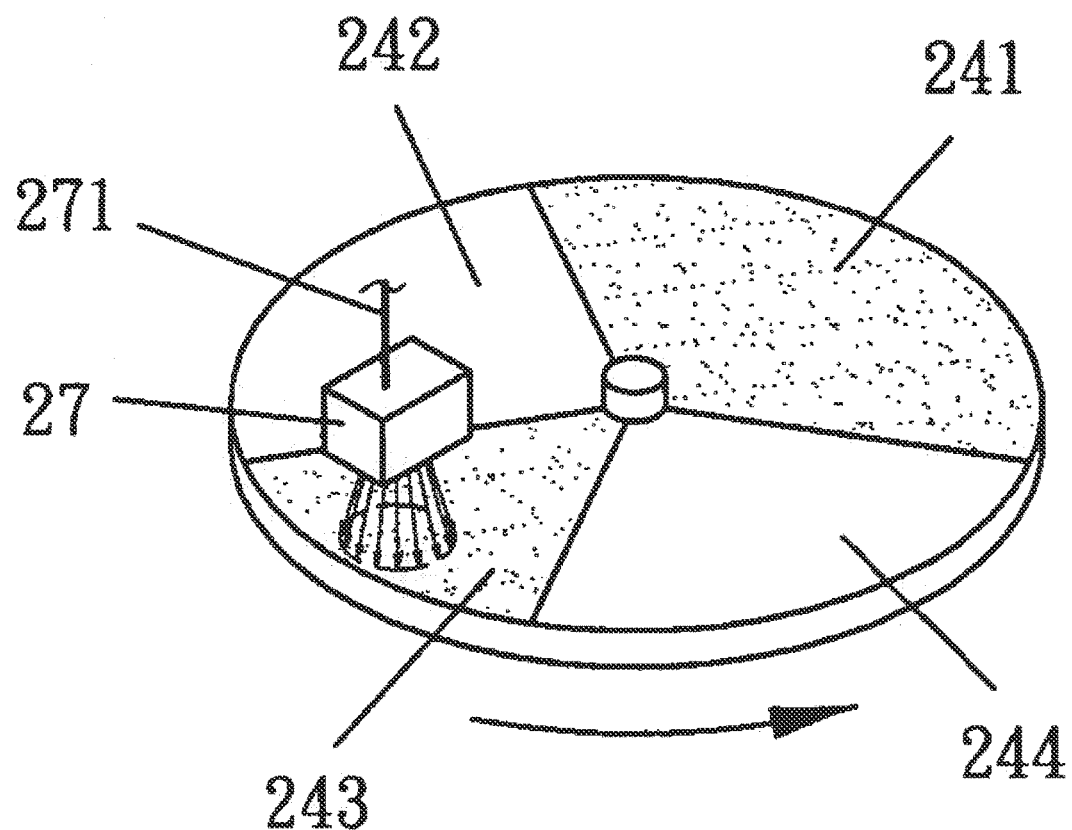

Next, the signal transmitted from the projector 27 is projected onto the region 244 (see FIG. 5). Since the region 244 does not include metal material, the signal can pass smoothly. Thus, the range covered the space 26 is normal (not crowded). As a result, the projector 27 will sense that the signal transmission is smooth.

Then, the signal transmitted by the projector 27 is projected onto the region 243 (see FIG. 6), since region 243 include the metal material, the transmission energy of the oscillation/sensing element 272 of the projector 27 is absorbed, and the projector 27 senses that the signal strength is lower than the set threshold (because the energy is absorbed by the object detected). Thus, the projector 27 will sense that the signal transmission is not smooth, and the projection power must be increased accordingly. Furthermore, the time length of the non-smooth transmission (corresponding to the width of the region) is calculated (and is compared with the region 241).

Figure 7:
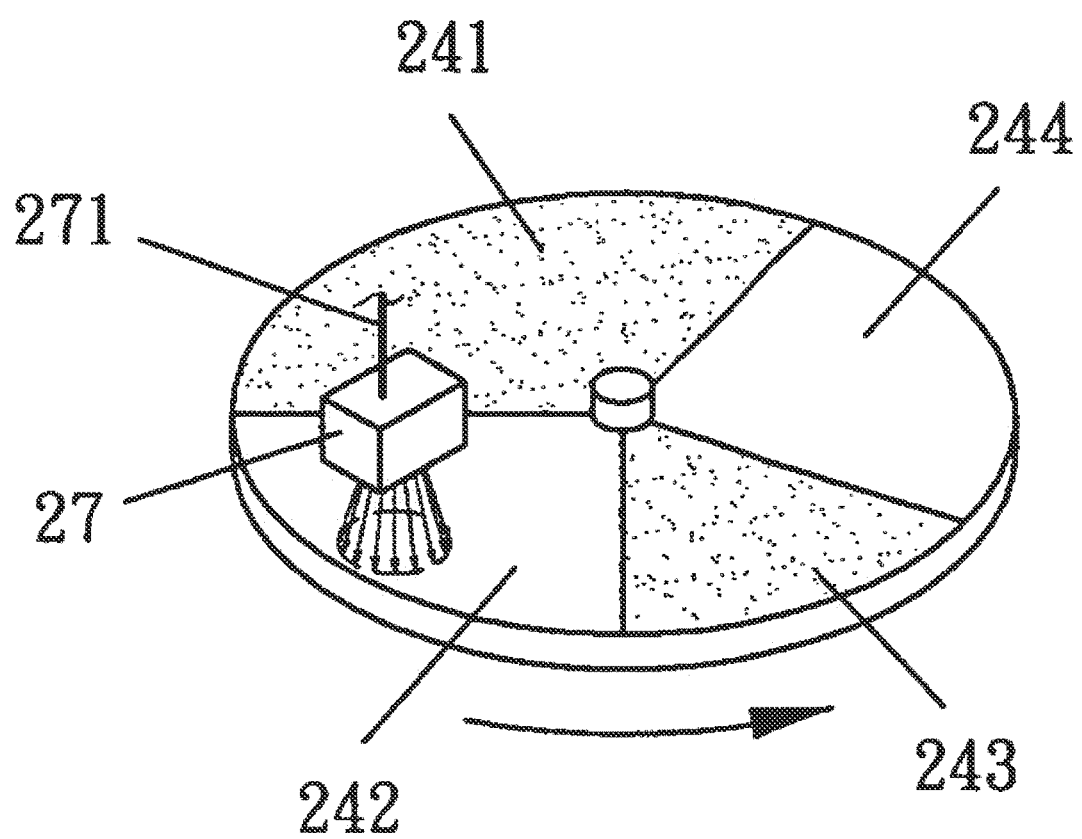

Next, the signal transmitted from the projector 27 is projected onto the region 242 (see FIG. 7). Since the region 242 does not include metal material, the signal can pass smoothly. Thus, the range covered by the space 26 is normal (not crowded). As a result, the projector 27 will sense that the signal transmission is smooth. The signals are then projected onto the regions 241, 244, 243, and 242 in sequence, and the above sensing operations are repeated.

Thus, when the projector 27 senses a change in the power of the signals transmitted by itself and follows the sequence of the change, the rotating direction of the operating member 24 can be identified to thereby know the corresponding flowing direction of the fluid. At the same time, since the projector 27 can sense the turns of rotation and the rotating speed of the operating member 24, the flow and flow rate of the fluid can be measured accordingly.

Figure 8:
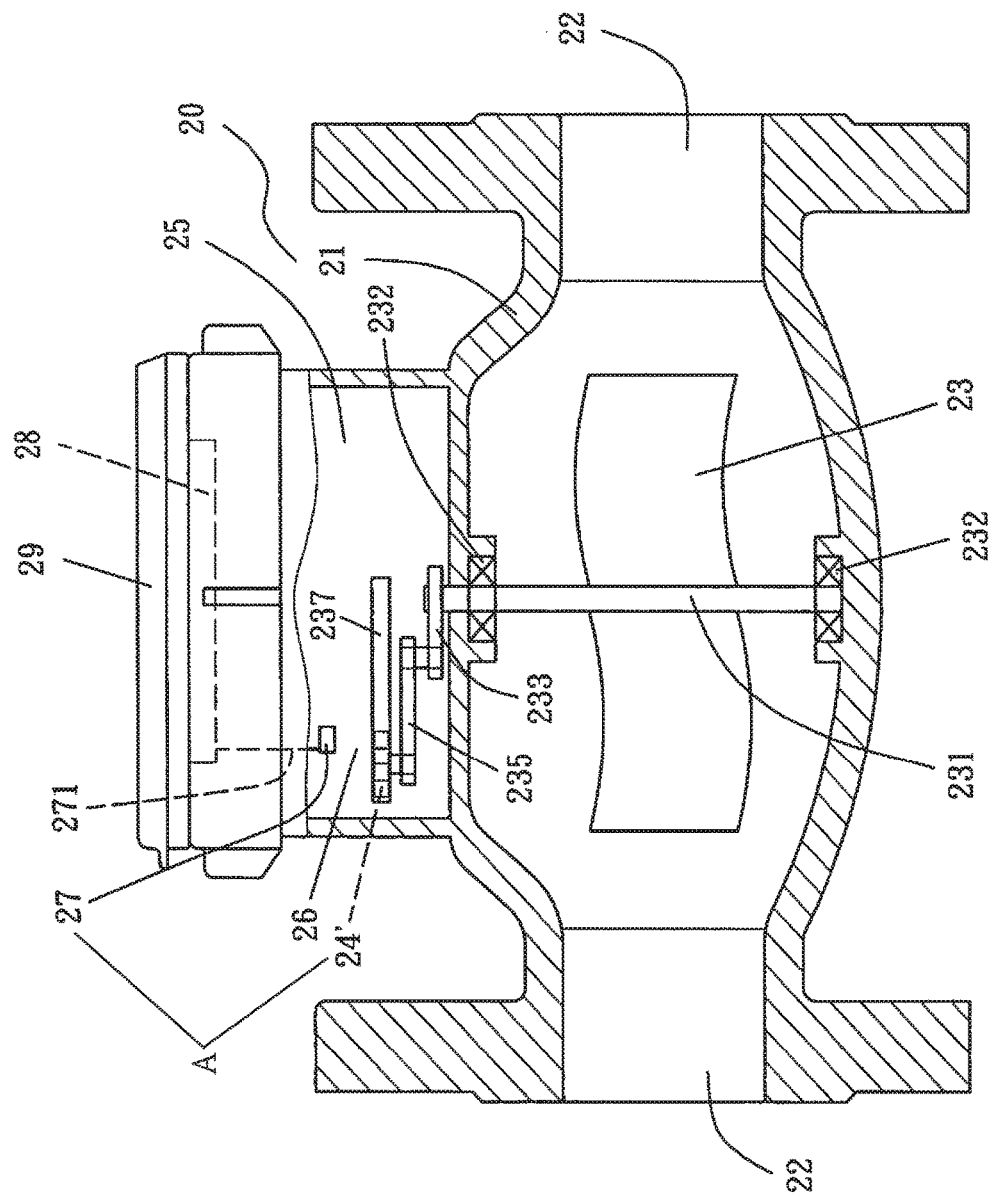
FIG. 8 is a diagrammatic cross sectional view of a flowmeter of a second embodiment according to the present invention.

FIG. 8 shows a second embodiment according to the present invention. Most components of the second embodiment are substantially the same as the first embodiment and are, thus, designated the same reference numbers. Specifically, the second embodiment is a flowmeter 20 including a body 21 having two open ends 22 and a hollow interior in which a movable member 23, such as a blade wheel, is mounted. The movable member 23 is configured to be driven by a fluid to rotate. The movable member 23 includes a shaft 231 that is supported by bearings 232 to extend upright in the body 21. A chamber 25 is located above the body 21 and receives the operating member 24. An upper end of the shaft 231 extends upward beyond the body 21 and is eccentrically connected to a rotating member 233 in the chamber 25. Thus, when the shaft 231 rotates, the rotating member 233 is actuated by the shaft 231 to rotate synchronously, which is a circular movement.

Figure 9:
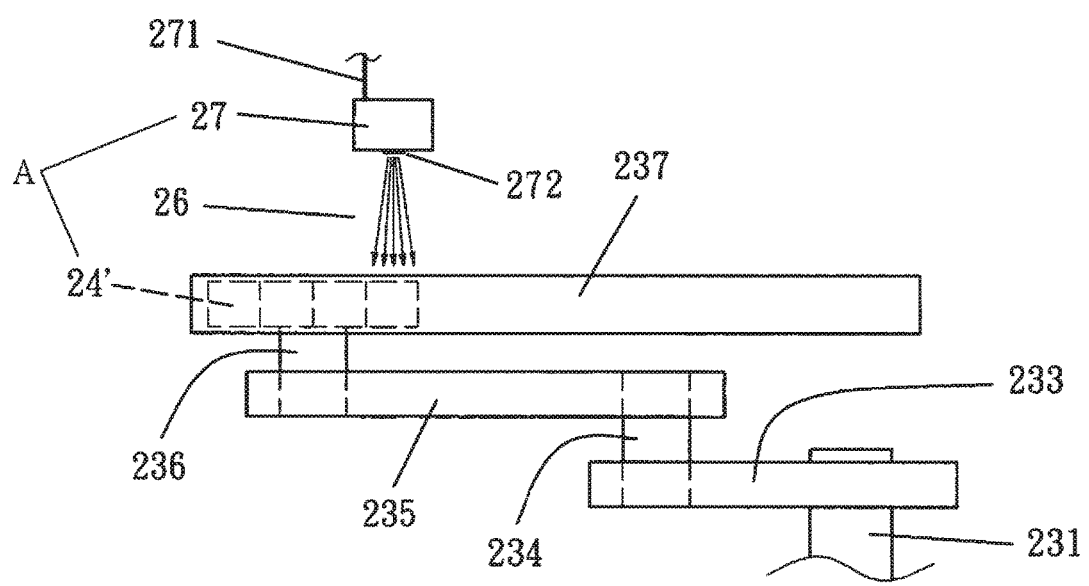
FIG. 9 is an enlarged diagrammatic view of a portion of the flowmeter of the second embodiment according to the present invention.
Figure 11:
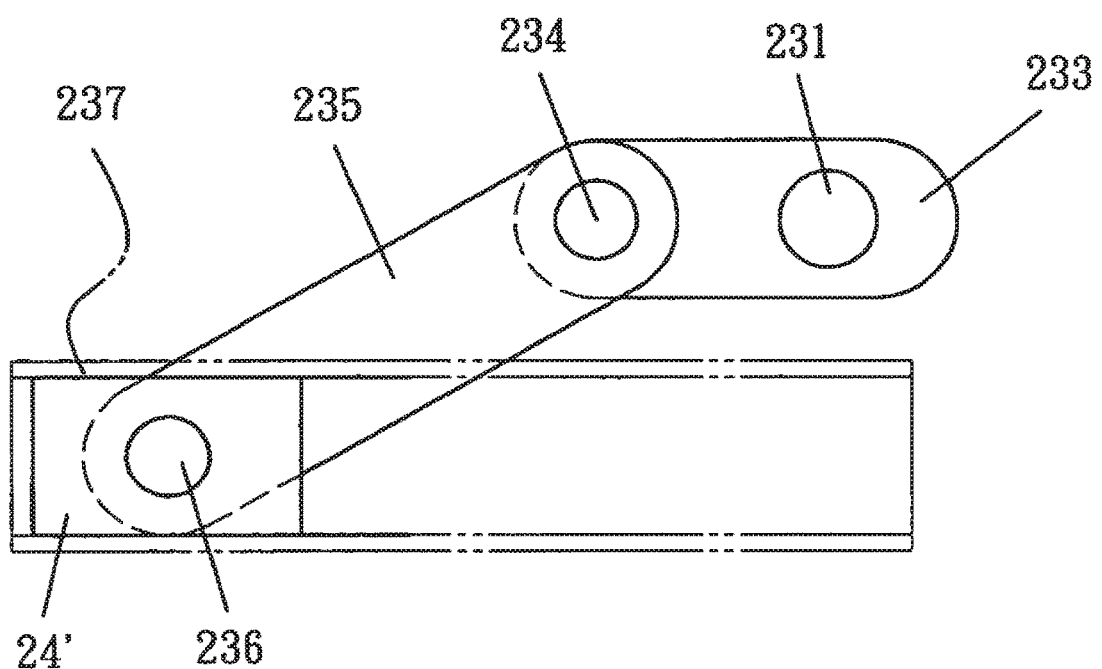
FIGS. 11-16 are diagrammatic perspective views illustrating operation of the flowmeter of the second embodiment according to the present invention.

Furthermore, with reference to FIGS. 9 and 11, an end of the rotating member 233 distant to the shaft 231 is connected by an axle 234 to a connecting rod 235. An end of the connecting rod 235 distant to the axle 234 is connected by an axle 236 to an operating member 24'. The operating member 24' is located in a span of a limiting member 237. A space 26 is defined in a side of the chamber 25 above the operating member 24'. A projector 27 is fixed in the space 26 and faces the operating member 24' to continuously transmit signals.

With reference to FIG. 17, the projector 27 includes an oscillation/sensing element 272 and a micro power driving/sensing circuit 273. The micro power driving/sensing circuit 273 is electrically connected to a micro power oscillation circuit 274 and a micro power signal filtering circuit 275. The micro power signal filtering circuit 275 is electrically connected to a micro power signal amplifying circuit 276. The micro power signal amplifying circuit 276 is electrically connected to a micro power signal strength detection circuit 277 for detecting an output signal. The oscillation/sensing element 272 proceeds with continuous detection which is advantageous in continuous detection of the position of the operating member 24' at any time under certain conditions of the operating member 24'.

Furthermore, the projector 27 is connected to an operating portion 28 by a connecting wire 271. A display portion 29 is disposed on a top face of the chamber 25 and can receive the result after operation of the operating operation 28 for direct display. Alternatively, the result of the operation is transmitted by wire or wireless transmission to a remote display portion for display purposes.

Figure 10:
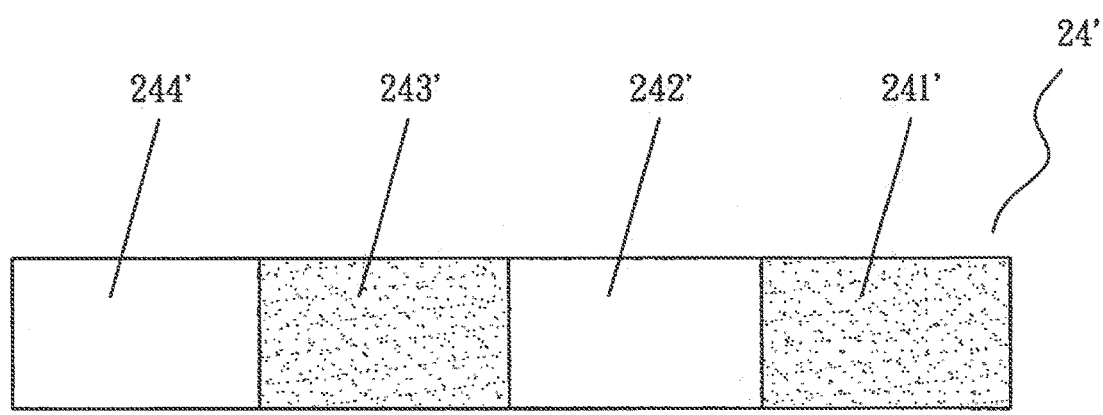
FIG. 10 is a top view of an operating member of the flowmeter of the second embodiment according to the present invention.

With reference to FIG. 10, the side of the operating member 24' receiving the signals from the projector 27 is divided into a plurality of regions 241', 242', 243', 244' (four regions in a non-restrictive example shown in FIG. 10). Two regions 241' and 243' include metal material (which can have the features the same as the metal material of the first embodiment). The densities (such as coating densities) of the metal material in the two regions 241' and 243' can be different or the same. The other two regions 242' and 244' do not include metal material.

In operation and use of the second embodiment according to the present invention, when the fluid flows in through different open ends 22, the rotating direction of the movable member 23 and its shaft 231 is different, which is the same as the first embodiment. The rotating member 233 is actuated to rotate in the same direction. Due to transmission by the connecting rod 235 and the limitation of the limiting member 237 (which functions as a track), the operating member 24' proceeds with a rectilinear reciprocating movement. Thus, the signals transmitted from the projector 27 will be reciprocatingly projected in the following sequence onto the regions 241', 242', 243', 244', 243', 242', 241' and so on.

Figure 12:
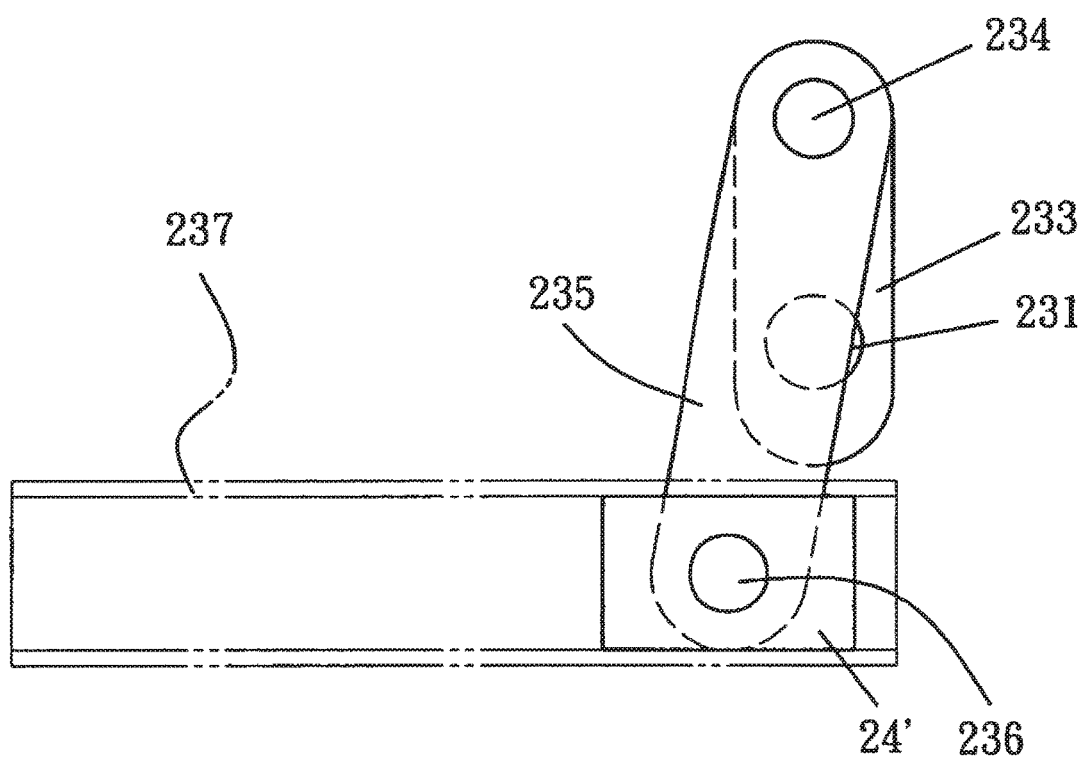

The reciprocating movement of the operating member 24' due to actuation by the rotating member 233 and the connecting rod 235 and the limitation by the limiting member 237 will be described in connection with FIGS. 11-16. When the axle 234 of the rotating member 233 is moved to the leftmost position of the circular movement, as shown in FIG. 11, the operating member 24' is in the leftmost position of the reciprocating movement. Then, when the axle 234 of the rotating member 233 moves upward (as viewed from the direction of the drawing sheet, which is also used as the reference for direction hereinafter) and rotates 90° to the uppermost position, as shown in FIG. 12, the operating member 24' moves rightward by the connecting rod 235.

Figure 13:
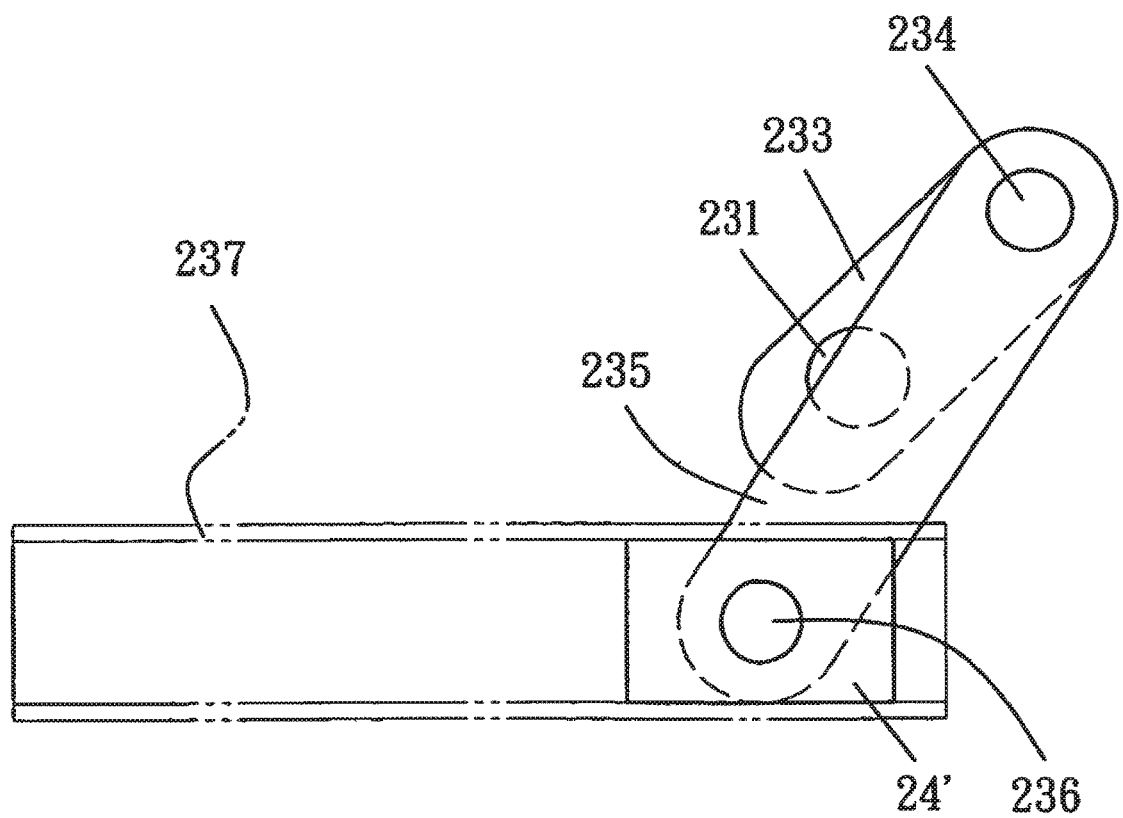
Figure 14:
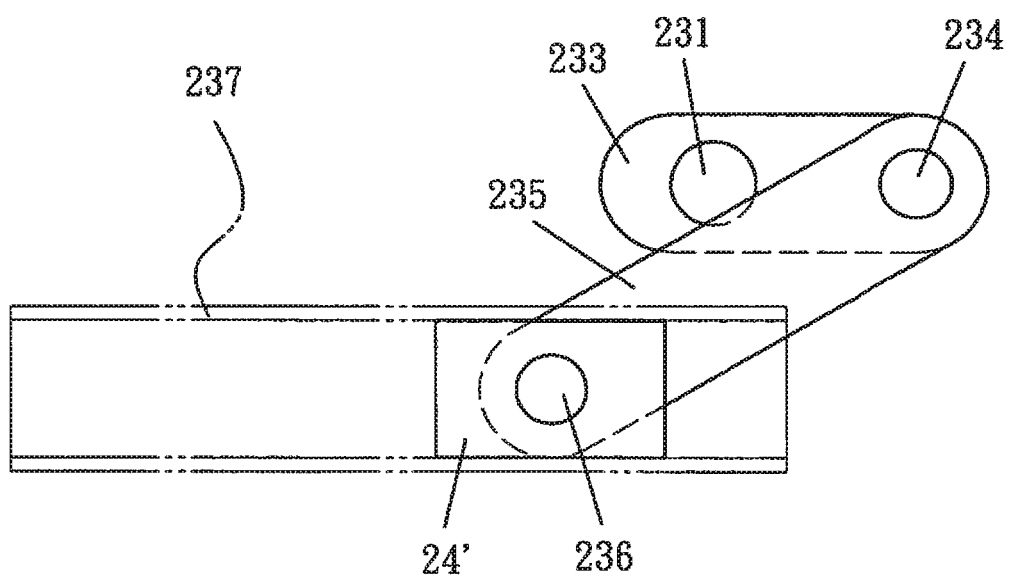
Figure 15:
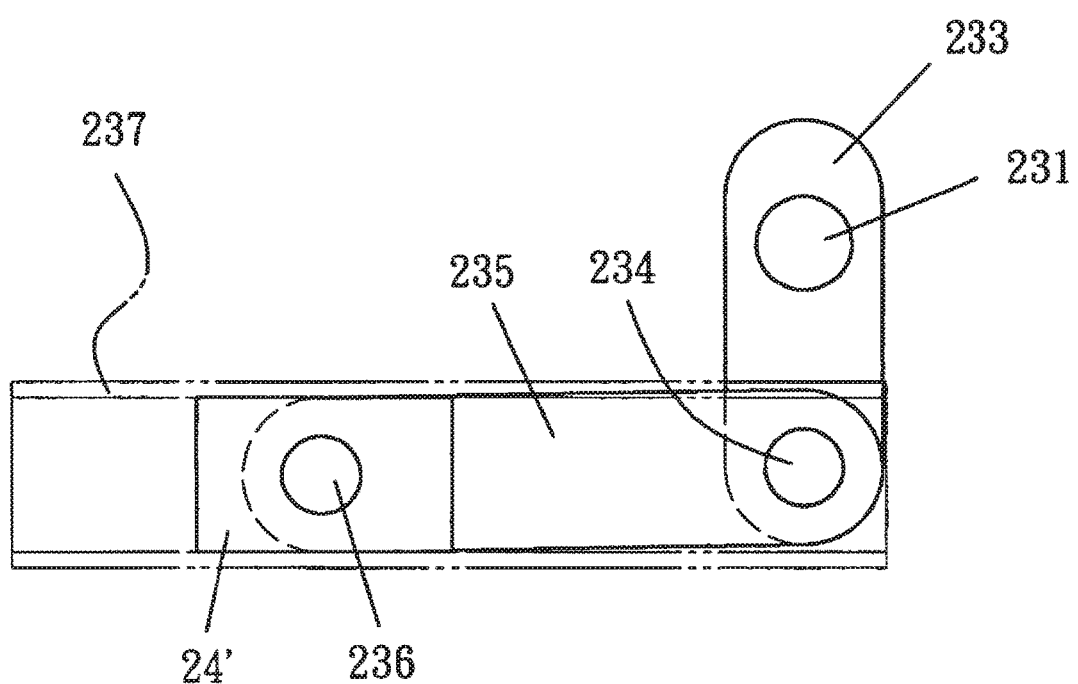
Figure 16:
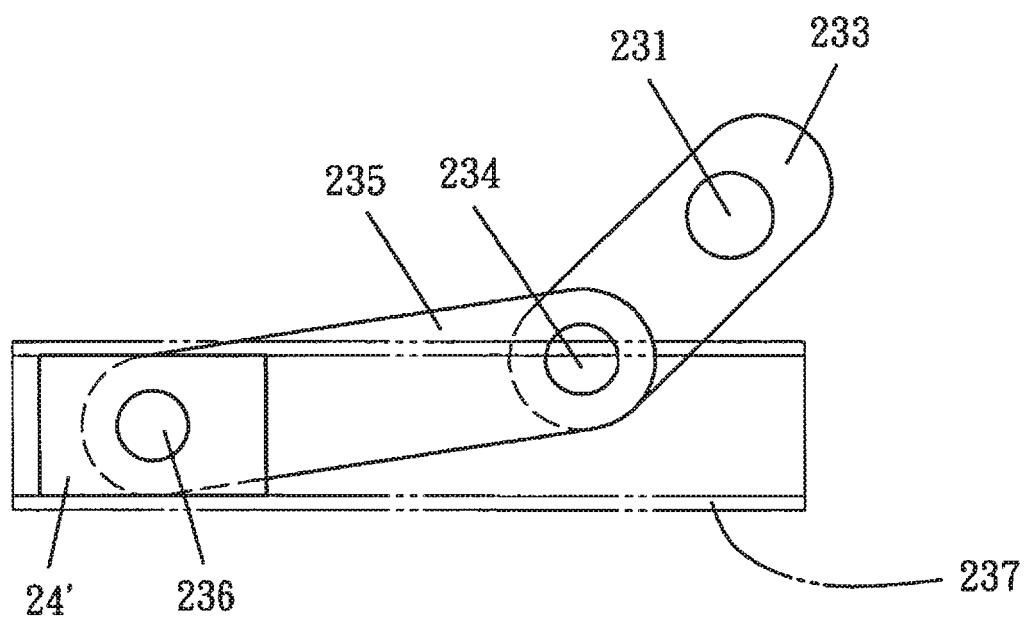

Next, as shown in FIG. 13, the axle 234 moves rightward and rotate 45°, the operating member 24' is moved further rightward. Then, as shown in FIG. 14, the axle 234 rotates downward to the horizontal (rightmost) position, the operating member 24' is moved leftward by a small distance. Next, as shown in FIG. 15, the axle 234 rotates downward to the lowest position, the operating member 24' is further moved rightward. Then, as shown in FIG. 16, when the axle 234 moves leftward and rotate 45°, the operating member 24' is moved further leftward. Next, the axle 234 returns to the position shown in FIG. 11.

Thus, under actuation of the rotating member 233 and the connecting member 235 and the limitation of the limiting member 237, the operating member 24' proceeds with a rectilinear reciprocating movement. After accurate design of the dimension, the reciprocating movement of the operating member 24' exactly passes through the signal projection area of the projector 27, such that the projector 27 senses the necessity of an increase in the transmission power when the two regions 241' and 243' pass therethrough, and the flowing direction of the fluid can be identified by the difference in the increased transmission power.

In view of the foregoing, the present invention uses an operating member 24, 24' having at least two regions 241-244, 241'-244' facing the projector 27. At least one of the regions 241, 243, 241', 243' reflects the signals projected thereon. Thus, the projector 27 continuously transmitting signals onto the operating member 24, 24' that proceeds with displacement (a circular movement or a rectilinear reciprocating movement), a signal density in the space between the projector 27 and the operating member 24, 24' is changed when the operating member 24, 24' is passing through the space (the range covered by the space is crowded), such that the projection power of the projector 27 is changed to thereby sense the flowing condition of the fluid.

Accordingly, the present invention has the following excellent features. Firstly, the projector 27 continuously transmit the signals and senses whether the signal transmission is smooth without any connection with other components, such that the projector 27 is not affected by external objects or external forces. Similarly, the operating member 24, 24' simply displaces without any connection with other components, such that the operating member 24, 24' is not affected by external objects or external forces. Secondly, the non-contact operation between the projector 27 and the operating member 24, 24' according to the present invention can be used to detect the flowing condition in the flowmeter 20. Thirdly, the oscillation/sensing element 272 of the projector 27 can proceed with continuous detection of the position of the operating member 24, 24' at any time under certain conditions of the operating member 24, 24'.

Although specific embodiments have been illustrated and described, numerous modifications and variations are still possible without departing from the scope of the invention. The scope of the invention is limited by the accompanying claims.

What is claimed is:

1. A non-contact continuous type sensing device for a flowmeter, with the flowmeter including a body and the sensing device, with the body including two open ends and a hollow interior in which a movable member is mounted, with the movable member configured to be driven by a fluid to move, with the movable member including a shaft mounted in the hollow interior of the body, with the flowmeter further including a chamber located outside of the body, with the sensing device mounted in the chamber, with the sensing device comprising an operating member and a projector, with the shaft of the movable member extending through and connected to the operating member, wherein the operating member is actuated by the shaft of the movable member to proceed with displacement when the movable member is driven by the fluid to rotate, with the projector mounted above the operating member and configured to project signals onto the operating member, with at least two regions defined in a side of the operating member facing the projector, with at least one of the at least two regions including metal material to reflect the signals projected thereon, with another of the at least two regions being a non-metal region, with the projector including an oscillation/sensing element and a micro power driving/sensing circuit, with the micro power driving/sensing circuit electrically connected to a micro power oscillation circuit and a micro power signal filtering circuit, with the micro power signal filtering circuit electrically connected to a micro power signal amplifying circuit, with the micro power signal amplifying circuit electrically connected to a micro power signal strength detection circuit for detecting output signals, wherein a signal density in a space between the projector and the operating member is changed when the at least two regions of the operating member is passing through the space, such that the projection power of the projector is affected to thereby sense a movement condition of the operating member and to thereby continuously know a flowing condition of the fluid.

2. The non-contact continuous type sensing device for a flowmeter as claimed in claim 1, wherein the displacement of the operating member actuated by the shaft of the movable member is a circular movement.

3. The non-contact continuous type sensing device for a flowmeter as claimed in claim 1, wherein the displacement of the operating member actuated by the shaft of the movable member is a rectilinear reciprocating movement.

4. The non-contact continuous type sensing device for a flowmeter as claimed in claim 1, with the at least two regions of the operating member including at least two regions having the metal material, and with the non-metal region located between the at least two regions, providing different reflections.

5. The non-contact continuous type sensing device for a flowmeter as claimed in claim 1, wherein the at least two regions of the operating member include at least two regions having the metal material and having a same width or different widths.

6. The non-contact continuous type sensing device for a flowmeter as claimed in claim 1, wherein the at least two regions of the operating member include at least two regions coated with the metal material with a same coating density or different coating densities.

7. A non-contact continuous type sensing method for a flowmeter, with the flowmeter including a body and a sensing device, with the body including two open ends and a hollow interior in which a movable member is mounted, with the movable member configured to be driven by a fluid to move, with the movable member including a shaft mounted in the hollow interior of the body, with the flowmeter further including a chamber located outside of the body, with the sensing device mounted in the chamber, with the sensing device including an operating member and a projector, with the shaft of the movable member extending through and connected to the operating member, wherein the operating member is actuated by the shaft of the movable member to proceed with displacement, with the projector mounted above the operating member and configured to project signals onto the operating member, with at least two regions defined in a side of the operating member facing the projector, with at least one of the at least two regions reflecting the signals projected thereon, wherein the method is featured by that a signal density in a space between the projector and the operating member is changed when the at least two regions of the operating member are passing through the space, such that the projection power of the projector is affected to thereby sense a movement condition of the operating member and to thereby continuously know a flowing condition of the fluid, wherein at least one of the at least two regions of the operating member is made of metal material, and another of the at least two regions is a non-metal region, providing different reflections, wherein the projector includes an oscillation/sensing element and a micro power driving/sensing circuit, the micro power driving/sensing circuit is electrically connected to a micro power oscillation circuit and a micro power signal filtering circuit, the micro power signal filtering circuit is electrically connected to a micro power signal amplifying circuit, and the micro power signal amplifying circuit is electrically connected to a micro power signal strength detection circuit for continuously detecting output signals.

* * * * *